United States Patent

Briggs et al.

[15] 3,670,100

[45] June 13, 1972

[54] AUTOMATIC REFERENCE LEVEL SET FOR TELEVISION CAMERAS

[72] Inventors: John A. Briggs, Salt Lake City; Ronald C. Ward, Taylorsville, both of Utah

[73] Assignee: Telemation, Inc., Salt Lake City, Utah

[22] Filed: March 29, 1971

[21] Appl. No.: 129,061

[52] U.S. Cl. ........................................178/7.1, 178/DIG. 26

[51] Int. Cl. ........................................................H04n 5/16

[58] Field of Search..............................178/7.1, 7.2, DIG. 26

[56] References Cited

UNITED STATES PATENTS 3,557,305 1/1971 Dann .................................178/7.1 X 3,571,508 3/1971 Roessel..................................178/7.1

OTHER PUBLICATIONS

RCA Technical Note No. 257, Morgan June, 1959.

*Primary Examiner*—Robert L. Richardson

*Attorney*—Lynn G. Foster

[57] ABSTRACT

Methods and apparatus for automatically establishing the voltage levels in a television camera which represent signal amplitude levels corresponding to the black and white reference levels by sensing the voltage level of a video signal channel as the image of the scene to be televised is scanned, comparing the sensed signal with a reference signal and establishing a digital signal indicative of whether the voltage of the sensed signal is greater or less than that of the reference, storing the digital information and, if desired, altering the information stored upon command from the comparator, establishing an output voltage signal having a magnitude determined by the stored or altered digital information and modifying the black and white levels from the camera.

6 Claims, 2 Drawing Figures

PATENTED JUN 13 1972 3,670,100

INVENTORS.
JOHN A. BRIGGS
RONALD C. WARD
BY [signature]
ATTORNEY

AUTOMATIC REFERENCE LEVEL SET FOR TELEVISION CAMERAS

BACKGROUND

1. Field of Invention

This invention relates to television cameras and is particularly directed to a method and apparatus for automatically establishing the voltage levels in a television camera which represent signal amplitude levels corresponding to black and white reference levels.

2. Prior Art

The video signals in a television camera may be considered to be "unidirectional" waveforms with one voltage amplitude level always representing "black" and a second level always representing maximum white. The amplitude of any signal which lies between them represents a degree of gray. There are seven components contained in the television waveform: horizontal line synchronizing pulses, color synchronizing burst, set-up (black) level, picture elements, color hue (tint), color saturation (vividness), and field synchronizing pulses. All seven of these components must be contained in amplitude between a zero carrier level and a maximum level specified by the Federal Communications Commission. If the amplitude difference between the maximum allowable white level and the maximum carrier voltage is considered to be divided into seven equal parts, the picture information signals are allowed to range between reference white and reference black levels which corresponds to five-sevenths of the total. The synchronizing signals are relegated to the other two-sevenths of this range. A "safety margin" is provided between zero carrier level and reference white level which is equal in amplitude to (an additional) one-seventh, making a total allowable amplitude from zero to a maximum amplitude of carrier eight-sevenths. The additional seventh may be considered a "safety margin" because the peak excursion of the luminance signal from blanking level does not include the chrominance signal. However, the fact is that some colors are "whiter" than reference white and can reach a level above the peak white level represented by the maximum luminance amplitude. Hence, a "safety margin" to prevent over modulation of the transmitter.

In practice, the total allowable modulation variance is often represented as if it were a variation in a signal level of one volt peak to peak. Blanking level is the level to which the receiver is "blanked" in order to prevent the retrace lines from being visible. This is ordinarily the zero reference point on the 1 volt peak-to-peak modulation variation. From this zero point, the white reference level would be represented by +0.7142857142 . . . volts and the "maximum carrier voltage" of the synchronizing excursions by −0.2857143 . . . volts. On this scale, standard set-up for the black reference level is placed at 7.5 percent of the voltage difference between peak white and zero blanking. This corresponds to +0.05371428 . . . volts.

Because of the importance of the reference black level and reference white level, not only because of FCC requirements but also to picture quality, these levels are normally "set" every time a camera is turned on. In the prior art, the process of setting in these reference levels usually requires the use of a relatively expensive piece of calibration equipment (an oscilloscope) and skilled technical personnel able to use it for manually adjusting potentiometers to the analog voltages or currents required. This process has always been time consuming, but the advent of color television has multiplied the number of controls requiring adjustment by three; one pair for each color channel. Thus, six controls must be not only set, as was the original pair in a monochrome system, but each of the six must be balanced and correlated with all of the others.

It has been obvious for some time that a method and apparatus for setting the black level and white level reference into the camera in a manner that would obviate the use of an oscilloscope or other measuring device, and eliminate the use of manually variable controls (and hence skilled operators) and which would attain high accuracy with maximum stability in a minimum of time, would have excellent commercial potential. Some prior art attempt have used electric motors to drive potentiometers but failed to couple this method with a means of gathering error data that was discriminating enough for a high order of accuracy. Another attempt used a capacitor as analog data storage receptacle. It had the difficiencies of only retaining the reference data for about one-half hour (when the system had to be reset). Further, it only set the black reference level.

BRIEF SUMMARY AND OBJECTS OF THE INVENTION

The subject invention solves the problems discussed by electrically comparing the output voltage of each color channel sensor (suitably filtered and processed) with a white level signal or a dark level signal as the scene to be televised is scanned. If the comparison discloses that the white analog voltage is greater than the comparison standard at any time that scene is scanned (one scan comprising a field) a "+ discrepancy" signal is generated. If, however, comparison discloses that the white analog voltage does not exceed the comparison stand a "− discrepancy" is generated.

In summary, the present invention relates to automatically establishing voltage levels that represent white and black reference light intensities by sensing the instantaneous voltage level of a video signal from a television camera image pick device, comparing this signal with a reference, and establishing a digital signal related to the video signal, storing the digital signal, converting the digital signal to an analog signal and using this analog signal as a Feed Back Signal to control the white and black reference levels of of the output video signal.

Accordingly, it is an object of the present invention to provide an improved method and apparatus for automatically maintaining the video output voltage values within the black and white reference levels of a television camera.

Another object of the present invention is to provide a method and apparatus for setting the maximum video voltage output values within the reference levels of a television camera without requiring the use of expensive equipment and highly skilled technicians.

A further object of the present invention is to provide a method and apparatus for minimizing the time required for setting the maximum video voltage output levels within the reference levels of a television camera.

Another prime object of the present invention is to provide a method and apparatus for automatically maintaining the video voltage output levels within the reference levels of a television camera by comparing the output voltage of each color channel sensor with a selected reference level signal as the scene to be televised is scanned, generating an error signal during each scan indicative of whether the sensed output voltage is greater or less than the reference level signal, supplying the error signals to a binary counter, periodically resetting the counter to zero, and employing the value held by the counter at the time it is reset to appropriately adjust the value of the sensed output voltage.

These and other objects and features of the present invention will be apparent from the following detailed description taken with reference to the accompanying drawing.

DETAILED DESCRIPTION OF THE ILLUSTRATED EMBODIMENT

Figures 1, 2:
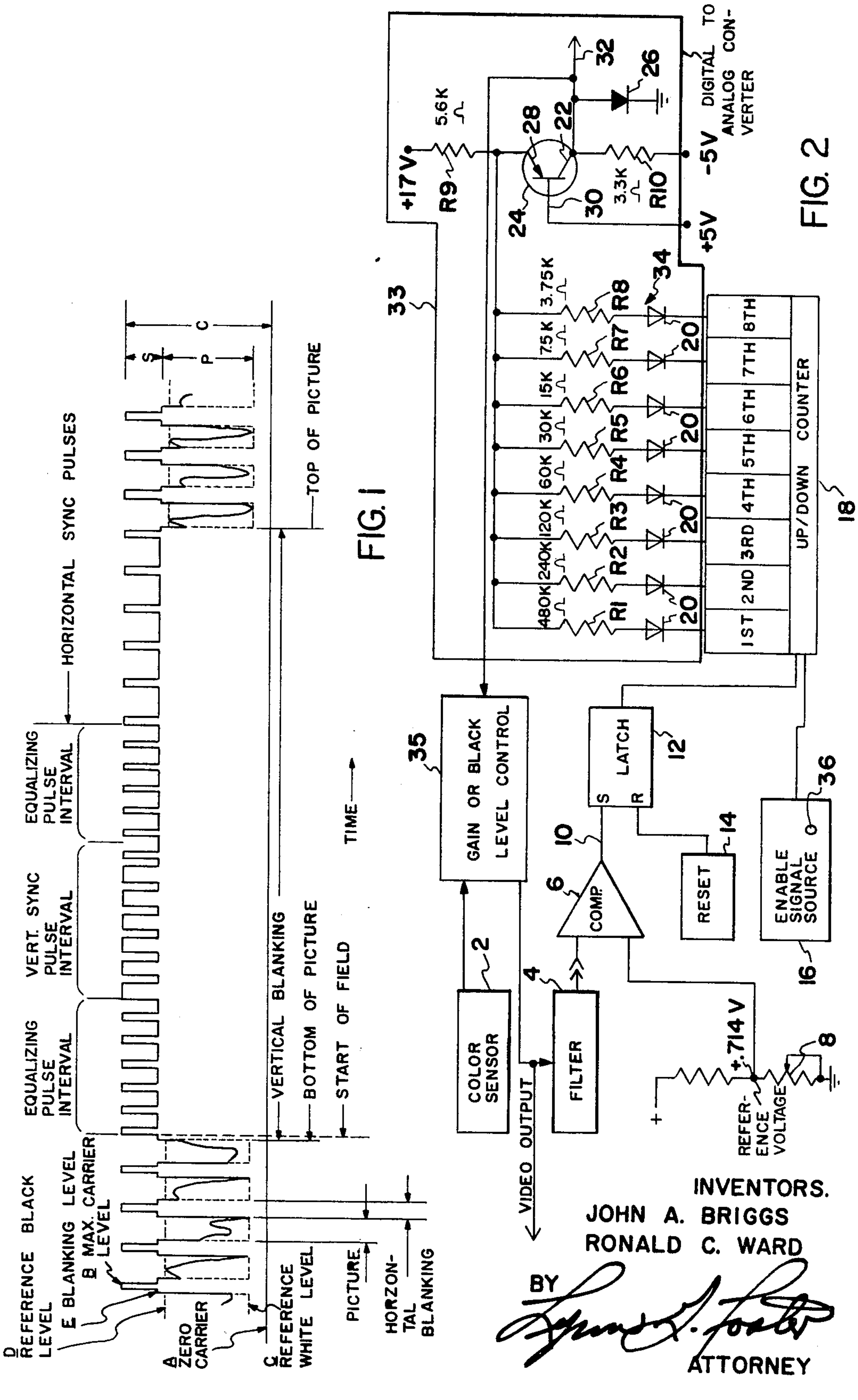
FIG. 1 is a diagrammatic representation of the video signal of a television camera showing the various reference levels.
FIG. 2 is a diagrammatic representation of apparatus embodying the present invention for automatically maintaining the video voltage output levels of a television camera within the desired limits.

As described above and shown in FIG. 1, the video signals may be considered to be "unidirectional" waveforms with one voltage amplitude level always representing "black" and a second level always representing maximum white. The amplitude of any signal which lies between them represents a degree of gray.

There are seven components contained in the television waveform: Horizontal line synchronizing pulses, color synchronizing burst, set-up (black) level, picture elements, color hue (tint), color saturation (vividness), and field synchronizing pulses. All seven of these components must be contained in amplitude between a zero carrier level and a maximum level specified by the Federal Communications Commission. These levels are indicated graphically on the attached drawing. "A" refers to the zero carrier level. "B" refers to the maximum carrier voltage. "C" refers to the reference white level, and "D" refers to the reference black level.

If the amplitude difference between the maximum allowable white level C and the maximum carrier voltage B is considered to be divided into seven equal parts, the picture information signals are allowed to range between reference white and reference black levels which corresponds to five-sevenths of the total. The synchronizing signals are relegated to the other two-sevenths of this range. The "safety margin" between zero carrier level and reference white level is equal in amplitude to (an additional) one-seventh making the total allowable amplitude from zero to maximum amplitude of eight-sevenths. The additional seventh may be considered a "safety margin" because the peak excursion of the luminance signal from blanking level does not include the chrominance signal. The fact is that some colors are "whiter" than reference white and can reach a level above the peak white level represented by the maximum luminance amplitude, hence a "safety margin" has been established to preclude "clipping" by the zero carrier level.

In practice, the total allowable modulation variance is often represented as if it were a variation in a signal level of one volt peak to peak. Blanking level (designated E on the diagram) is the level to which the receiver is "blanked" in order to prevent the retrace lines from being visible. This is ordinarily the zero reference point on the 1 volt peak-to-peak modulation variation. From this zero point, the peak white point would be represented by +0.7142857142 . . . volts and the "-maximum carrier voltage" of the synchronizing excursions by -0.2857143 . . . volts. On this scale, standard set-up for black (D on the reference drawing) is placed at 7.5 percent of the voltage difference between peak white and zero blanking. This corresponds to +0.05371428 . . . volts.

Because of the importance of these reference levels, not only because of FCC requirements but also to picture quality, it has been conventional to adjust a camera each time it is turned on to be certain that these reference levels are correct even with changes in scene illumination.

According to the prior art methods, setting in these reference levels usually requires the use of a relatively expensive piece of calibration equipment (an oscilloscope) and skilled technical personnel able to use it for manually adjusting potentiometers to the analog voltages or currents required. This process has always been time consuming but the advent of color television has multiplied the number of controls requiring adjustment by three; one pair for each color channel. Thus six controls must be not only set as was the original pair in a monochrome system but each of the six must be balanced and correlated with all of the others.

It has been obvious for some time that a method and apparatus for setting the black level and white level reference into the camera in a manner that would obviate the use of an oscilloscope or other measuring device, and eliminate the use of manually variable controls (and hence skilled operators) and which would attain high accuracy with maximum stability in a minimum of time, would have excellent commercial potential. This is accomplished with the device of the present invention by electrically comparing the output voltage of each color channel sensor (suitably filtered and processed) with a white level signal or a dark level signal as the scene to be televised is scanned. If the comparison discloses that the white analog voltage is greater than the comparison standard at any time that scene is scanned (one scan comprising a field) a "+ discrepancy" signal is generated. If, however, comparison discloses that the white analog voltage does not exceed the comparison stand a "−discrepancy" is generated. The apparatus by which these discrepancy signals are utilized to develop an analog voltage will be discussed in conjunction with the accompanying block diagram, FIG. 2.

Although it is possible to sense during the entire field of scan, it is generally preferable to select an electronic "window" which is sensed during the scanning of a field rather than sensing the full field. This is readily accomplished by gating the output signals so as to accept signals only during the scanning of a rectangle of lines in the middle portion of the field scan. The choice of size of the "window" is not critical. The voltage output from the red, green or blue color sensor 2 is connected to the gain and/or black level control circuit 35 to make the necessary level modification to the video signal. The signal then takes two routes, one to the video output to be used. The other is suitably filtered by optional filter 4 to remove noise and is then compared in a comparitor 6 with the standard voltage for the level to be set which is selected on potentiometer 8. Thus, for the white reference level, the voltage of the comparison criterion is +0.714 . . . volts. If the sensed voltage is greater than the comparison criterion a high output (binary 1) is developed at the output 10 of the comparison stage 6. If the sensed voltage is less than the criterion voltage, a low output (binary 0) is developed at output 10. The binary 1 output signal at output 10 from the comparitor 6 is developed at the first instance in which a video output voltage which exceeds the reference voltage. Subsequent instances in the same field scan have no effect because the initial high (binary 1) becomes a set signal for a latching flip-flop stage 12 and that stage cannot be set again until a signal is received from reset means 14 at the end of the field scan. At the end of field scan just prior to the signal from reset means 14 to the latch flip-flop 12, a signal from enabling source 16 is applied to the eight bit binary up/down counter 18 which causes the counter 18 to count up by one digit if the output of the latch flip-flop 12 is binary 1. If the field scan produces no instance of a peak voltage higher than the reference criterion, the latching flip-flop 12 remains unset at the end of the field scan when the signal from enabling source 16 is sent to the binary counter 18. Since the latch 12 is unset, the input signal to the binary counter is a binary 0, causing the binary counter 18 to count down, rather than up.

The binary counter 18 is connected to a analog-to-digital converter 33 which produces an analog output representative of the binary number in the counter. When the counter 18 is "full", i.e. the output of all eight stages are binary 1, the eight diodes, indicated at 20, are back biased and no current can flow through them. The collector 22 of the summing transistor 24 would then, if it were not for the connection of diode 26 to ground, rise to a positive value of approximately 2 volts. The connection of diode 26 to ground, however, conducts and prevents the collector 22 from rising above +0.6 volts.

Conversely, if the counter 18 is empty (binary 00000000), the low output states function as if they were at ground potential, hence all of the diodes 20 are forward biased and their associated resistors R1 to R8 are effectively in parallel and have a resistance sum of approximately 1.88 K ohms. The paralleled resistors R1 to R8 act in conjunction with the 5.6 K ohm emitter resistor R9, as a voltage divider. The resulting potential at the emitter 28 of the transistor 24 is not sufficiently positive with respect to the base 30 to give forward bias to the transistor 24 and cause emitter and collector current to flow.

Since no current flows through the 3.3 KΩ load resistor, R10, no voltage is "dropped" and the collector 22 is at a potential of −5 V. The color level analog voltage at output 32 thus ranges between +0.6 volts with a full counter to −5.0 volts with the counter empty.

The resistor R1 to R8 which comprise the summing matrix, indicated generally at 34, are arranged so that the second resistor R2 has a value which is equivalent to two of the first resistors R1 connected in parallel. It will, therefor, allow twice the amount of current to pass for the same impressed potential. Similarly the third resistor R3 is equal in value to two of the second resistors R2 in parallel or to four of the first resistors R1 in parallel and will therefore allow four times the current as through the first resistor R1 when both are at the same potential. From this it can be seen that, if the current in the resistor R1 connected to the first stage (all stages at binary 0) passes a current, $i_o$, then the current in the second stage resistor $R_2$ can be expressed by the relation: $i_{R1} = 2i_{R2}$, and the current through each resistor is $i_{R8} = 2^7 i_{R1}$, $i_{R7} = 2^6 i_{R1}$, $i_{R6} = 2^5 i_{R1}$, $i_{R5} = 2^4 i_{R1}$, $i_{R4} = 2^3 i_{R1}$, $i_{R3} = 2^2 i_{R1}$, $i_{R2} = 2^1 i_{R1}$, and $i_{R1} = 2^0 i_{R1}$.

The total current from the matrix 34 is $$i_T = (2^7 + 2^6 + 2^5 + 2^4 + 2^3 + 2^2 + 2^1 + 2^0)(i_{R1}) \text{ or, } i_T = 255\, i_{R1}$$

Noting that the exponents in the above equation are equivalent to the positional weights associated with the Radix 2 or binary notation, it can be seen that the current from the matrix 34 will always represent the commensurate value of the binary number describing the output of the up/down counter 18. If for example stages one, three, four, and five of counter 18 are at low (or ground) potential and low is the significant state (current is down), the binary description would be 11101 and the current sum would be $2^4 + 2^3 + 2^2 + 2^0$ times the unit current. The unit current is approximately (5.3 V/480 KΩ= 0.011 mA, so (16 + 8 + 4 + 1)(0.011 mA) = 0.319mA for the total current.

The current through emitter resistor R9 remains at approximately 2 mA because the emitter 28 must remain at 5.6 volts to maintain forward bias, so R9 must drop 11.4 volts. Since 0.319 mA is "drained way", the current through base 30 and collector 22 are reduced proportionally and the voltage drop across R10 will be reduced. This feedback voltage at connection 32 is used to control the video level by the gain control stage 34 or, in the case of the control of black level, block 35 becomes a black level control circuit of known type. The actual value of the voltage at 32 will vary with the characteristics of actual components when the counter 18 has the configuration discussed in the above example, but will usually range between −0.3 V and =0.5. These variations are not important to the accuracy of the system, however because, so long as a discrepancy exists between the white reference level and the sensed voltage in the comparitor 6, the binary counter 18 will continue count up or down to reduce that discrepancy. When the compared voltages are so close together that next ensuing correction increases, rather than decreases the error, the counter 18 will reverse the direction of change and if the scene scanned remains at a constant level of luminocity, will alter-nate above or below the required value by the slight amount corresponding to one incremental change (≈0.011 mA). In practice, since the largest discrepancy must be reduced to + one increment within 455 sequential fields (about 7.6 seconds) an enabling button 36 or enabling source 16 is provided to control the comparison function. If the button 36 is pressed for 8 or 10 seconds and released, the white reference signal will be within one deviation of the desired value at the time of release. The act of releasing the enabling button 36 leaves the binary up/down counter 18 in the last state which it had attained at the time the enable button 36 was released. The color level signal at output 32 will thus remain at the set level. The notable features are that all three color channels are set and balanced in less than 10 seconds without the use of auxiliary equipment such as an oscilloscope and with no required skill level other than the ability to push a button and count to 10 slowly.

As described, the circuit of FIG. 2 serves to maintain the voltage level of one of the color video signals (for instance, red) in proper relation with the white reference level. Two additional similar circuits would be required to accomplish this for the other two color signals, blue and green.

In order to compare the video signals with the black reference level, it is necessary to reset potentiometer 8 to the black reference value of +0.054 volts and to replace the load resistor R10 to provide a resistance of 430 ohms to ground in lieu of the white level resistance of 3.3K ohms to −5 volts. This would result in a voltage level at output 32 ranging between +0.8 volts, with all resistors of matrix 34 holding high values, to zero volts, with all resistors of matrix 34 grounded by counter 18. While one specific digital-to-analog converter has been herein described, it is not to be appreciated that other digital-to-analog converters could be used.

Obviously, if desired, additional circuits incorporating the foregoing substitutions could be provided to permit full time monitoring with respect to both the black and white reference levels. Alternatively, switching means could be provided to permit monitoring of a selected video color signal and to provide the substitutions required to accommodate both black and white reference sensing with a single circuit of the type described above. In addition, numerous other variations and modifications may be made without departing from the present invention. Accordingly, it should be clearly understood that the form of the present invention described above and shown in the accompanying drawing is illustrative only and is not intended to limit the scope of the invention.

I claim:

1. Apparatus for establishing and maintaining the video white and black levels in a television camera, said apparatus comprising:

sensing means sensing the instantaneous voltage levels of a video signal from the camera image pickup tube;

reference means establishing a reference signal as a basis of comparison;

comparison means connected to compare the video signal from said camera pickup tube to the reference signal and emitting a digital signal indicative of whether the voltage of the sensed signal is greater or less than the reference signal;

counter means to store digital information;

means modifying the digital information present in the counter by command from the comparator;

digital-to-analog converter means to convert the digital information stored to an analog control signal;

means to modify video signal voltages representing white and black levels with the analog control signal.

2. The apparatus of claim 1 further comprising:

latch means connected between said comparison means and said counter means to limit the rate of change of the counter means information during each field scan of said sensing means, and reset means connected to reset said latch means upon completion of each field scan by said sensing means.

3. The apparatus of claim 1 wherein:

said comparison means emit one binary signal when the value of the sensed voltage is greater than that of the reference signal and emit an opposite binary signal when the value of sensed voltage is less than that of the reference signal.

4. The apparatus of claim 3 wherein:

said counter means comprise an up/down counter which counts up upon receipt of one binary signal from said comparison means and counts down upon receipt of the opposite binary signal from said comparison means.

5. The apparatus of claim 3 wherein:

said counter means comprise at least one unidirectional counter.

6. The method of maintaining the video voltage levels in a television camera, said method comprising the steps of:

sensing the voltage level of a video signal as the image from scene to be televised is scanned;

establishing a reference signal having a voltage indicative of a selected reference level;

comparing the sensed signal with said reference signal and establishing a digital signal indicative of whether the voltage of the sensed signal is greater or less than that of said reference signal;

counting in a desired direction upon command by the digital signal for control purposes during a predetermined interval of time;

establishing a feedback voltage signal proportional to the count during said interval; and using the feedback voltage signal to modify set peak voltage levels.

* * * * *